United States Patent [19]

Bohata

[11] Patent Number: 4,943,203
[45] Date of Patent: Jul. 24, 1990

[54] RETRIEVER TRUCK

[76] Inventor: John Bohata, 25 Champlain St., Port Jefferson Station, N.Y. 11776

[21] Appl. No.: 306,420

[22] Filed: Feb. 6, 1989

[51] Int. Cl.⁵ .......................... B65G 67/02; B60P 1/64
[52] U.S. Cl. ...................................... 414/486; 414/541
[58] Field of Search ............... 414/474, 475, 476, 477, 414/478, 479, 482, 483, 484, 485, 486, 491, 494, 495, 496, 498, 500, 541, 540

[56] References Cited

U.S. PATENT DOCUMENTS

| | | | |
|---|---|---|---|
| 2,405,299 | 8/1946 | Godwin | 414/484 |
| 2,732,087 | 1/1956 | Pratt . | |
| 2,786,590 | 3/1957 | Edwards et al. | 414/477 |
| 3,138,269 | 6/1964 | Wilkins . | |
| 3,472,407 | 10/1969 | Corompt | 414/494 X |
| 3,539,060 | 11/1970 | Rastelli . | |
| 3,794,192 | 2/1974 | Monson . | |
| 4,245,947 | 1/1981 | Clement . | |
| 4,265,585 | 5/1981 | Hawkins . | |
| 4,645,405 | 2/1987 | Cambiano | 414/494 |
| 4,659,276 | 4/1987 | Billett . | |
| 4,704,063 | 11/1987 | Updike, Jr. et al. | 414/494 X |
| 4,778,327 | 10/1988 | Tufenkian et al. | 414/541 |
| 4,802,811 | 2/1989 | Nijenhuis | 414/478 |

FOREIGN PATENT DOCUMENTS

| | | | |
|---|---|---|---|
| 0002056 | 5/1979 | European Pat. Off. | 414/494 |
| 2455228 | 5/1976 | Fed. Rep. of Germany | 414/491 |
| 2112329 | 3/1983 | Fed. Rep. of Germany | 414/541 |
| 3621366 | 1/1988 | Fed. Rep. of Germany | 414/541 |
| 3708066 | 9/1988 | Fed. Rep. of Germany | 414/541 |
| 838648 | 12/1938 | France | 414/486 |

Primary Examiner—Robert J. Spar
Assistant Examiner—Robert S. Katz
Attorney, Agent, or Firm—Leonard Belkin

[57] ABSTRACT

A vehicle having a flat bed for transporting a waste product container by placing the container fully on the bed. A groove in the bed is provided for a carriage which is winch operated down the length of the vehicle. A vertically movable member is mounted on the carriage which can drop below the level of the bed when the carriage is at the rear of the vehicle. Forks extending from the vertically movable member engage the container and raise it so that it can be moved over the bed and placed there for secure transporation.

7 Claims, 5 Drawing Sheets

FIG. I

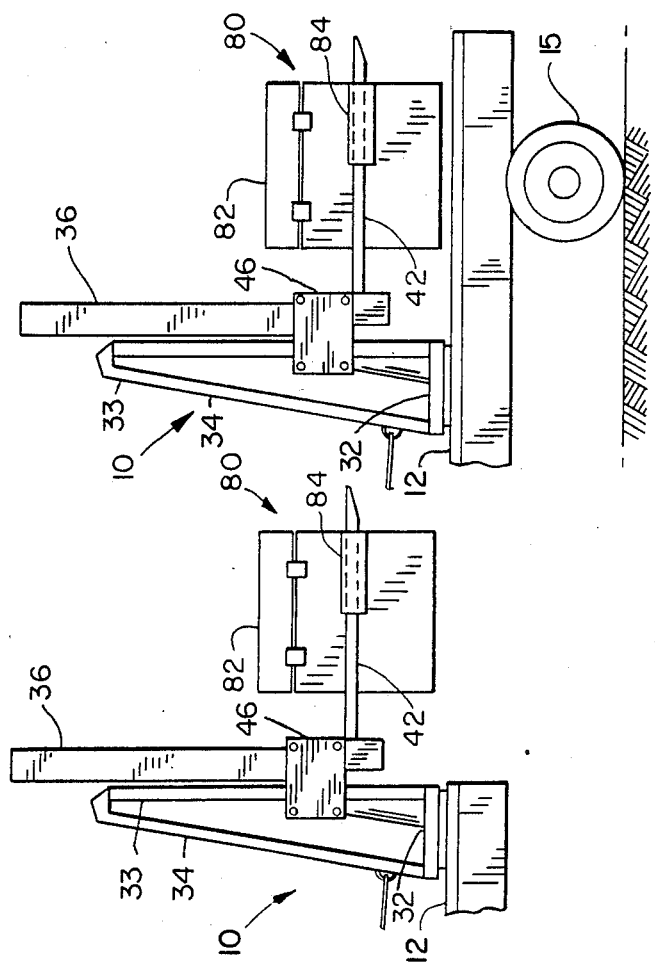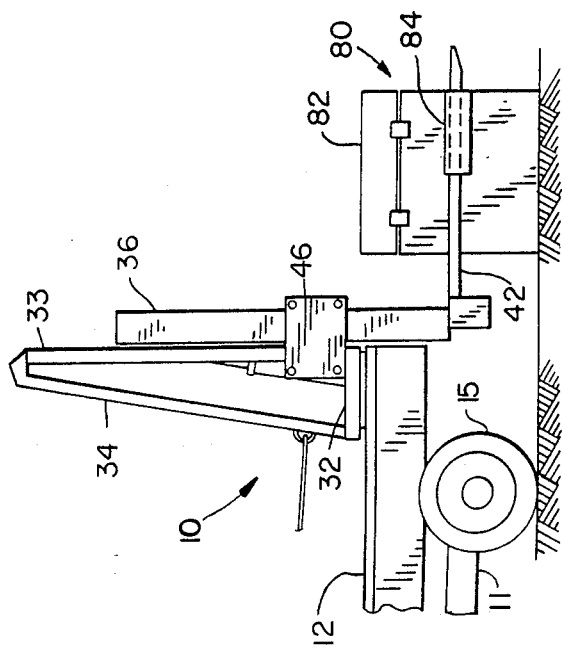

RETRIEVER TRUCK

BACKGROUND OF THE INVENTION

The present invention relates to a retriever truck and more particularly to a vehicle for transporting high capacity trash containers.

High capacity trash containers, sometimes referred to as dumpsters, have in recent years become in general use for the accumulation of trash and garbage. In a typical scenerio, garbage collection trucks follow a route on a regular basis, stopping at the site of each container, raising the container, and tilting it to empty the contents of the container into the garbage truck. The truck will then go on to the next pickup site.

With the large number of trash containers located at sites over wide areas it frequently becomes necessary to relocate a container, sometimes when it is full of trash or garbage. Typically, a garbage truck will be used for this purpose, raising the container and carrying the latter behind it. The mounting of a heavy steel container behind the garbage truck, especially when the container is loaded with trash or garbage, can create a hazardous situation due to some loss in steerability of the truck. Hence, there is a need for a vehicle designed specifically for the purpose of transporting a trash container.

A number of designs for carrying loads on a vehicle are shown in U.S. Pat. Nos. 2,732,087, 3,138,269, 3,539,060, 3,794,192, 4,245,947, 4,265,585 and 4,659,276. None of these patents teaches or suggests the present invention.

SUMMARY OF THE INVENTION

In this invention there is provided a vehicle specifically designed to transport a trash container.

According to a preferred embodiment of this invention, a vehicle with a flat bed has a groove running the length of the bed in which is located tracks for a carriage or dolly with wheels to ride. A winch is provided to position the carriage. Mounted on the carriage, at the level of the bed, is a container support assembly with a pair of forks to engage the container. When the dolly is positioned at the end of the bed of the vehicle, the forks can be lowered to a point below the level of the bed to engage the container. A hydraulic of winch arrangement is provided to lower and raise the forks. The container is then raised to a point where the carriage can be retracted until the container is above the bed, and can be lowered to the bed where it can remain until it is transported to its new site.

With the arrangement just described, the vehicle carrying the container is not adversely affected by a load supported behind the rear wheels, and in fact as the load would normally be distributed between the rear and front wheels of the vehicle, the steering of the vehicle is not adversely affected, and in fact steerability is improved.

It is thus a first object of this invention to provide a vehicle specifically designed to transport high capacity trash containers.

Other objects and advantages of this invention will hereinafter become obvious from the following description of preferred embodiments of this invention.

BRIEF DESCRIPTION OF THE DRAWINGS

FIGS. 4, 5, and 6 are side elevation views of the rear of the vehicle showing the sequence of steps involved in the lifting of a container and placing it on the bed of the vehicle.

DETAILED DESCRIPTION OF THE PREFERRED EMBODIMENTS

Figure 1:
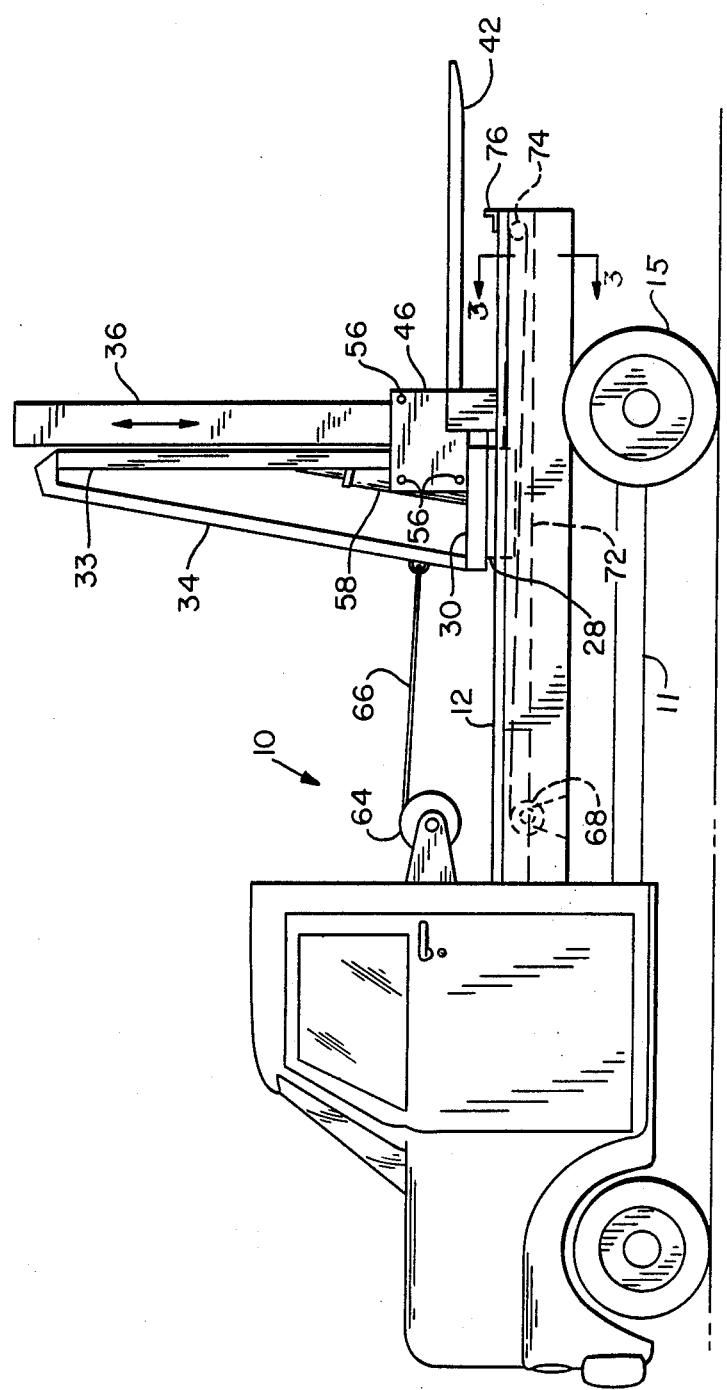
FIG. 1 is an elevation view of a vehicle incorporating the principles of this invention.
Figure 2:
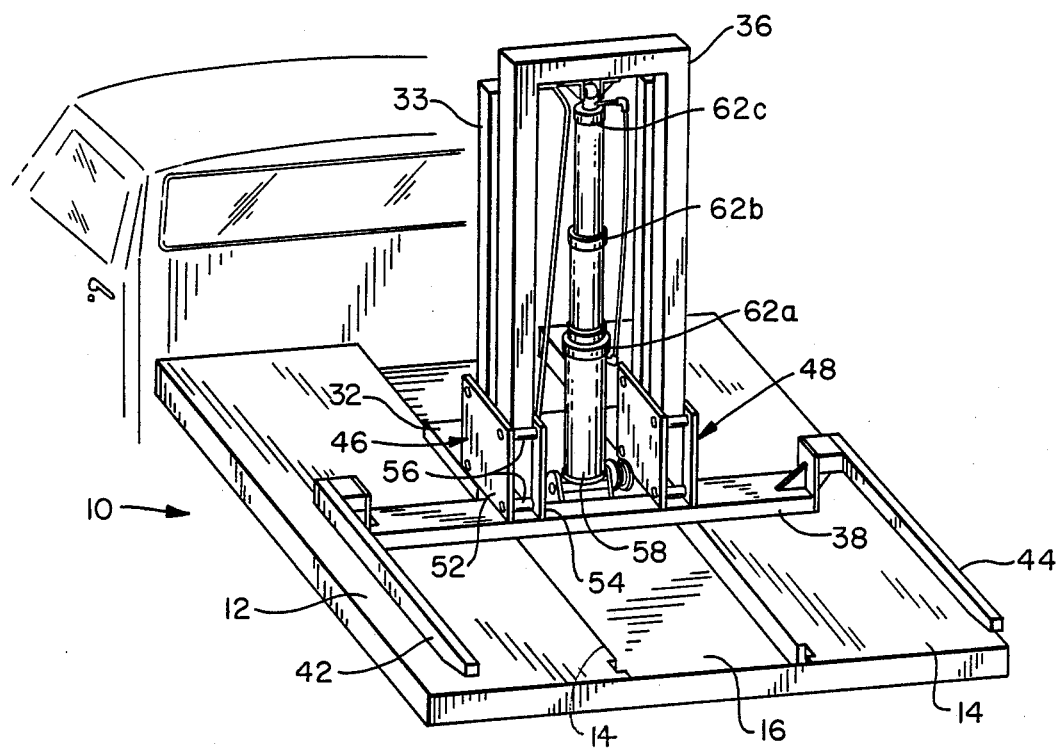
FIG. 2 is an isometric view taken from the rear of the vehicle shown in FIG. 1.
Figure 3:
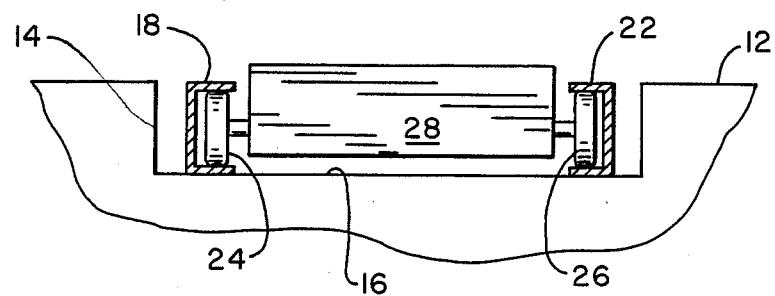
FIG. 3 is a section taken along 3—3 of FIG. 1.

Referring to FIGS. 1, 2, and 3, vehicle 10 is a truck with a flat bed 12 which has a groove 14 extending along the central axis of the bed. Bed 12 extends beyond rear wheels 15 as illustrated. On the bottom surface 16 of groove 14 are located a pair of channels 18 and 22 on their sides with their openings facing each other as illustrated. Channels 18 and 22 form tracks for the four wheels, of which two, namely, 24 and 26, are shown supporting a carriage or dolly 28 which travels along the length of groove 14.

Supported on carriage 28 is a platform 32 whose purpose will be described below. Mounted on platform 32 is a vertically extending inverted U-shaped unit 33 with a strut 34 extending down and back from the top of unit 33 to platform 32. A vertically extending member 36 having an inverted U-shaped configuration, and which is movable in the vertical direction as indicated by the double-headed arrow, is located just to the rear of unit 33. Attached to the bottom of member 36 is a cross member 38 which supports on its ends a pair of elongated members called forks 42 and 44 which are of the correct length and spacing to engage the container as will be further described.

A pair of identical floating assemblies 46 and 48 maintain the legs of member 36 adjacent the legs of unit 33 as illustrated. Assembly 46 consists of a pair of square plates 52 and 54 with four rollers 56 on the corners. Assembly 48 is similarly constructed. In this manner, member 36 has the ability to be moved vertically up and down and remain adjacent to unit 33. As will be seen later, assemblies 46 and 48 also limit the travel of member 36 in both directions.

To control the movement of member 36 there is provided a multi-stage hydraulic cylinder 58 the bottom of which is pivotally mounted on platform 32. Extending from the top of cylinder 58 are pistons 62a, 62b, and 62c, the uppermost one of which is pivotally connected to the top of member 36 as illustrated. The actuation of cylinder 58 will result in the raising and lowering of member 36. As is understood in the art cylinder 58 is provided with a source of hydraulic fluid under pressure and controls (not shown).

In order to effect and control the movement of carriage 28, there is provided an electrically operated winch 64 mounted on the back of the cab of vehicle 10 with a cable 66 attached to strut 34. A second winch 68 mounted on the bottom of groove 14 near the front of vehicle 10 is connected to the opposite end of carriage 28 by way of a cable 72 passing over a pulley wheel 74 mounted on the rear of vehicle 10. An L-shaped member 76 mounted along the rear of bed 12 limits the rearward travel of carriage 28.

For the operation of the apparatus just described, reference is made to FIGS. 4, 5, and 6. As seen in FIG. 4, container 80 to be lifted and placed on bed 12 of vehicle 10, is resting on the ground. Container 80 is a conventional, box-like device with a pair of hinged covers on the top, with one of the covers 82 shown in the open position. On each side of container 80 is a sleeve such as sleeve 84 illustrated, there being an identical such sleeve on the opposite side of container 80 to be engaged by forks 42 and 44 to lift container 80.

Vehicle 10 backs up to a point adjacent container 80 as illustrated in FIG. 4 and carriage 28 is moved to the rear end of bed 12 using winch 68. Member 36 is then lowered by the operation of hydraulic cylinder 58 until forks 42 and 44 are aligned with sleeves 84. Assemblies 46 and 48 limit the downward travel of member 36. Vehicle 10 is then backed up further until forks 42 and 44 pass through sleeves 84.

As seen in FIG. 5, member 36 is raised by the operation of hydraulic cylinder 58 thereby lifting container 80 until the bottom of the latter is above bed 12. Assemblies 46 and 48 stopping at the top of unit 33 limit the upward travel of member 36. Then, as shown in FIG. 6, winch 64 is actuated to pull carriage 28 toward the front of vehicle 10. When the back of container 80 clears the rear of bed 12, container 80 is lowered until it rests on bed 12. With container 80 thus placed, vehicle 10 can be operated safely and in a normal fashion.

To place container 80 at a new site, the procedure described above is reversed.

In order to reduce the height and weight of member 36 by eliminating the need to drop forks 42 and 44 below the level of bed 12 as shown in FIG. 4, bed 12 may be designed to pivot around rear wheels 15.

Figure 6A:
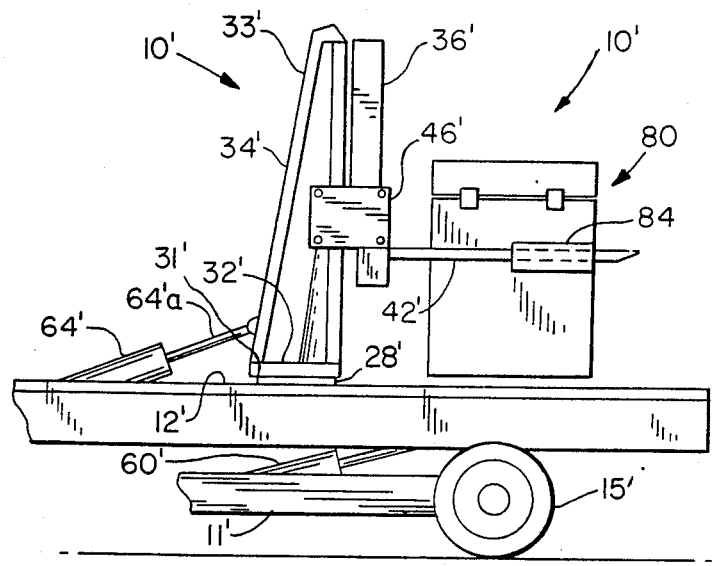
FIG. 6A corresponds to FIG. 6 showing an alternative embodiment of this invention.
Figure 6B:
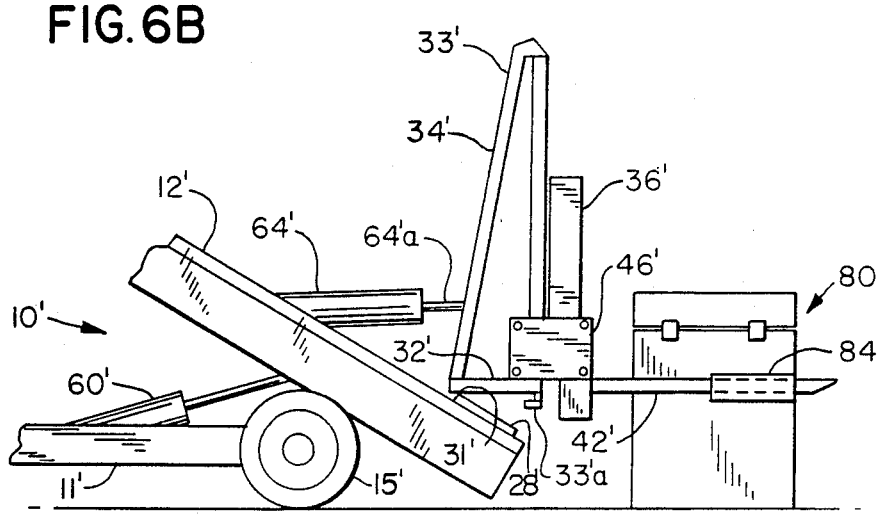
FIG. 6B shows how the embodiment of FIG. 6A engages a trash container.

Such an arrangement is shown in FIGS. 6A and 6B wherein is illustrated a vehicle 10' having a chassis 11' with a flat bed 12' pivoted about wheels 15' by a hydraulic cylinder piston 60' mounted on chassis 11' to raise and lower bed 12' so that bed 12' is like that of the bed of a dump truck. The construction of bed 12' is otherwise identical to that of bed 12 in FIGS. 1-6 except that a hydraulic cylinder 64' with a piston 64'a is employed both to push forward and retract the dolly 28' and to rotate platform 32' pivotally mounted at 31' on dolly 28'. A conventional latch 33'a engages a matching element on the dolly so that latch 33'a would be released when unit 33' with vertically extending member 36' is to be pivoted as seen in FIG. 6B so that unit 33' will remain vertical to permit proper engagement with container 80. It would also be necessary to lock dolly 28' against movement when unit 33' is to be pivoted. Piston 64'a extending from hydraulic cylinder 64' engages strut 34' as illustrated.

From the arrangement seen in FIGS. 6A and 6B it is seen that container 80 can be engaged without lowering assembly 46' and its matching assembly on the other side below the level of bed 12' since the rear of the latter pivots down so that fork 42' and its fork on the other side can engage sleeve 84 and the sleeve on the other side of container 80. In this manner, member 36' can be made much shorter and much lighter, and vehicle 10' can function also as a dumpster with unit 33' and member 36' retracted close to the cab.

Figure 7:
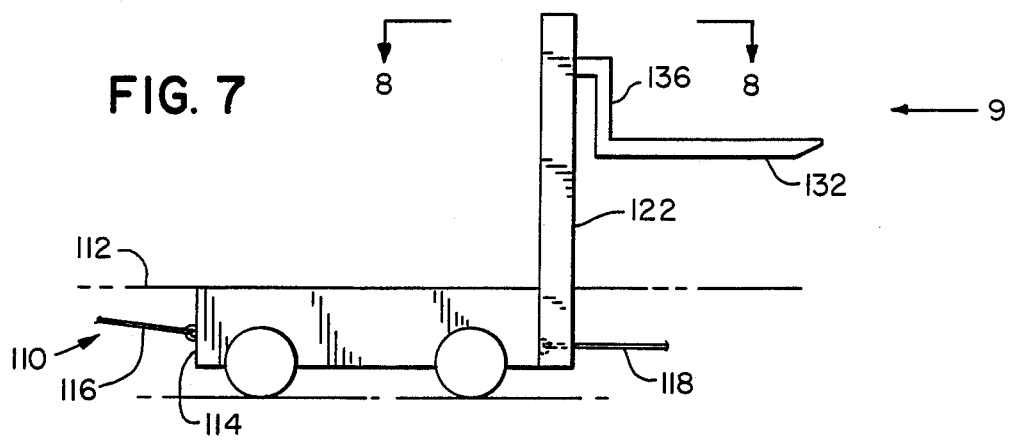
FIG. 7 is a partially schematic, side elevation view of the carriage in an alternative embodiment.
Figure 8:
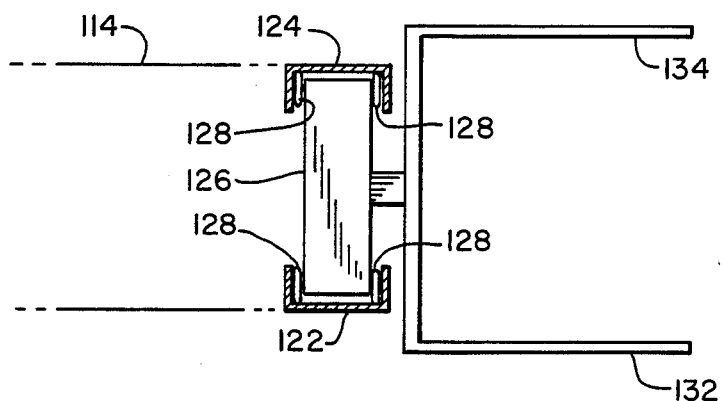
FIG. 8 is a section along 8—8 of FIG. 7.
Figure 9:
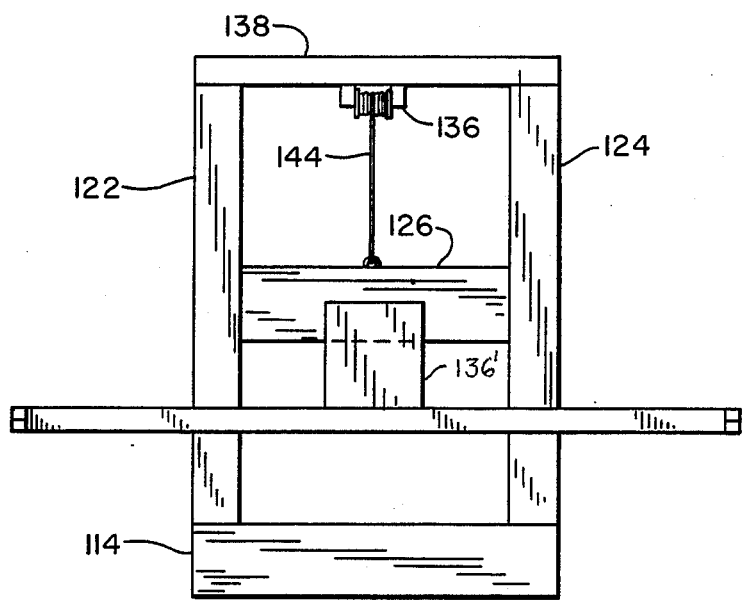
FIG. 9 is a right side view of the carriage assembly shown in FIG. 7.

In the arrangements just described, a hydraulic cylinder is employed to raise and lower the forks. Under some circumstances it might be desirable to dispense with the use of a hydraulic system and employ only winches for all controls. Such an arrangement is shown in FIGS. 7, 8, and 9.

Illustrated is vehicle 110 with bed 112 having a carriage 114 mounted in a groove as shown and described in connection with the arrangement shown in FIGS. 1-6. Shown are cables 116 and 118 connected to carriage 114 to be driven by winches (not shown) identical to the drive arrangement previously described. Mounted on the rear of carriage 114 are a pair of vertically extending channels 122 and 124 whose openings face each other. Riding in the space between channels 122 and 124 is a trolley 126 having four wheels 128 to facilitate its vertical movement. Extending from one side of trolley 126 are a pair of forks 132 and 134 downwardly offset by a member 136 so that forks 132 and 132 will be able to engage a container at ground level when trolley 126 is down adjacent carriage 114.

To drive trolley 126 there is provided a winch 136 mounted under a cross member 138 located across the top ends of channels 122 and 124. Cable 144 extending down from winch 136 is attached to the top of trolley 126.

Winch 136 is electrically driven, raising trolley 126, and relying on gravity for being lowered as cable 144 is paid out.

The arrangement shown in FIGS. 7, 8, and 9 functions in the same way as the embodiment shown in FIGS. 1-6 except that all power is derived from electrically operated winches which generally cost less than hydraulic systems, are lighter in weight, and will function just as well in this type of situation.

In the embodiments of this invention which have been described it is seen that there has been provided an inexpensive yet highly effective way of moving large loading waste containers with a higher degree of safety than heretofore has been possible.

While only certain preferred embodiments of this invention have been described, it is understood that many modifications are possible without departing from the principles of this invention as defined in the claims which follow.

What is claimed is:

1. A vehicle having a flat bed for transporting a waste product container having fork receiving means which are normally located below said bed when container is at ground level comprising:
   a. a groove formed in said bed extending along the central axis of said bed;
   b. spaced tracks in the bottom of said groove extending the length of said groove;
   c. carriage means mounted for travel on said tracks;
   d. means for driving said carriage means along the length of said groove;
   e. first vertically extending means mounted on said carriage means;
   f. second vertically extending means located to the rear of and adjacent to said first vertically extending means, said second vertically extending means being movable vertically;
   g. free floating means embracing both of said adjacent vertically extending means so that said vertically extending means remain adjacent each other and at the same time permit vertical movement of said second vertically extending means;

h. rearwardly extending fork means mounted on said second vertically extending means capable of engaging said fork receiving means of said container;
i. means for actuating said second vertically extending means for vertical movement;
j. said second vertically extending means clearing the rear of said vehicle when said carriage means is moved to the rear of said vehicle, whereby said secodn vertically extending means can be lowered to engage a container at ground level, raise said container above the bed of said vehicle, and said carriage means can be moved toward the front of said vehicle so that said container can be lowered to rest completely on said bed; and
k. means for tilitng the bed of said vehicle to enable said fork means to engage said container at ground leverl without having to drop below the level of said bed.

2. The vehicle of claim 1 in which the means for actuating said second vertically extending means comprises hydraulic cylinder and piston means mounted at one end on said carriage means and the other end attached to said second vertically extending means so that extension of the piston in said hydraulic cylinder and piston means causes said second vertically extending means to rise.

3. The vehicle of claim 1 in which said free floating means functions to limit vertical travel of said second vertically extending means in both directions.

4. A vehicle having a chassis and a flat bed pivotally mounted, on said chassis for transporting a waste product container having fork receiving means comprising:
a. a groove formed in said bed extending along the central axis of said bed;
b. spaced tracks in the bottom of said groove extending the length of said groove;
c. carriage means mounted for travel on said tracks;
d. means for driving said carriage means along the length of said groove;
e. first vertically extending means pivotally mounted on said carriage means;
f. second vertically extending means located to the rear of and adjacent to said first vertically extending means said second vertically extending means being movable vertically;
g. free floating means embracing both of said adjacent vertically extending means so that said vertically extending means remain adjacent each other and at the same time permit vertical movement of said second vertically extending means;
h. rearwardly extending fork means mounted on said second vertically extending means capable of engaging said fork receiving means of said container;
i. means for actuating said second vertically extending means for vertical movement;
j. means for pivotong said bed to lower the rear end of said bed and said vertically extending means when said carriage is located at the rear of said bed; and
k. said means for diriving said carriage means acting to pivot said first vertically extending means to maintain the latter in a vertical extending postition to permit said fork means to engage said container.

5. The vehicle of claim 4 in which said means for driving said carriage means comprises a hydraulic cylinder mounted on said bed having a piston extending therefrom to engage said first vertically extending means.

6. The vehicle of claim 5 in which said first vertically extending means includes latch means to prevent pivoting of said first vertically extending means, said latch means being released to permit said first vertically extending means to be pivoted by said hydraulic cylinder.

7. A vehicle having a flat bed for transporting a waste product container having fork receiving means which are normally located below said bed when container is at ground level comprising:
a. a groove formed in said bed extending along the central axis of said bed;
b. spaced tracks in the bottom of said groove extending the length of said groove;
c. carriage means mounted for travel on said tracks;
d. means for driving said carriage means along the length of said groove;
e. vertically extending means mounted on said carriage means;
f. trolley means mounted on said vertically extending means for vertical movement;
g. rearwardly extending fork means capable of engaging said fork receiving means of said container mounted on said trolley means;
h. means mounted on said vertically extending means for actuating said trolley means for vertical movement;
i. said rearwardly extending fork means having a pair of spaced, parallel fork members offset downwardly below the bed of said vehicle so as to engage said container situated at ground level, whereby said trolley means is raised by said means for actuating said trolley means so that said container is above said bed, and said carriage means can be moved toward the front of said vehicle so that said container can be lowered to rest completely on said bed;
k. means for tilting the bed of said vehicle to enable to engage said container at ground level without having to drop below the level of said bed.

* * * * *